United States Patent [19]

Zamudio-Tena et al.

[11] Patent Number: 4,828,845

[45] Date of Patent: May 9, 1989

[54] XYLITOL COATED COMESTIBLE AND METHOD OF PREPARATION

[75] Inventors: Jose F. Zamudio-Tena, Morristown; Allan H. Graff, Randolph, both of N.J.

[73] Assignee: Warner-Lambert Company, Morris Plains, N.J.

[21] Appl. No.: 942,133

[22] Filed: Dec. 16, 1986

[51] Int. Cl.$^4$ .............................................. A23G 3/30
[52] U.S. Cl. ........................................ 426/5; 426/302; 426/303; 426/305; 426/548
[58] Field of Search ................. 426/5, 3, 4, 6, 103, 426/302, 303, 305, 548; 424/16, 20, 31-38, 48

[56] References Cited

U.S. PATENT DOCUMENTS

| | | | |
|---|---|---|---|
| 1,267,320 | 5/1918 | Fries | 426/5 |
| 2,262,087 | 11/1941 | Bartlett et al. | 426/5 |
| 2,460,698 | 2/1949 | Lindhe | 426/5 |
| 2,536,168 | 1/1951 | Goggin | 426/5 |
| 3,556,814 | 1/1971 | Whitman et al. | 426/302 |
| 3,570,417 | 3/1971 | Herrmann et al. | 426/5 |
| 3,622,352 | 11/1971 | Daylor | 426/5 |
| 3,671,266 | 1/1972 | Cooper et al. | 426/309 |
| 3,737,322 | 6/1973 | Frey | 426/658 |
| 3,769,438 | 10/1973 | Rusch et al. | 426/302 |
| 3,969,513 | 7/1976 | Canonne | 426/5 |
| 4,065,578 | 12/1977 | Reggio et al. | 420/548 |
| 4,105,801 | 8/1978 | Dogliotti | 426/99 |
| 4,127,645 | 11/1978 | Witzel | 424/44 |
| 4,127,677 | 11/1978 | Fronczkowski et al. | 426/5 |
| 4,146,653 | 3/1979 | Mader et al. | 427/3 |
| 4,238,510 | 12/1980 | Cherukuri et al. | 426/5 |
| 4,254,149 | 3/1981 | Rudolph et al. | 426/5 |
| 4,317,838 | 3/1982 | Cheruhuri et al. | 426/5 |
| 4,423,086 | 12/1983 | Devos et al. | 427/3 |

FOREIGN PATENT DOCUMENTS

0210845 11/1984 Japan ......................... 426/5

OTHER PUBLICATIONS

U.S. Patent Application Ser. No. 905,732 Filed 9/09/86 "Chewing Gum Mineral Supplement".
Abstract No. 77-91416Y/51.
Abstract No. 77-48163Y/27.
Chemical Abstract No. 95:12774e.
Chemical Abstract No. 102:12422b.
Chemical Abstract No. 72(5)20708b.
Food Science & Technology Abstracts 039642.
Food Science & Technology Abstracts 033878.
Chemical Abstracts vol. 53, No. 3540a.
Abstract 012550 70-01-L0003.

*Primary Examiner*—Jeanette Hunter
*Attorney, Agent, or Firm*—Henry C. Jeannette; Charles A. Gaglia, Jr.

[57] ABSTRACT

A xylitol coated comestible is disclosed. The coated comestible comprises an edible core and a xylitol coating thereon, said coating comprising about 40 to about 70 wt % xylitol, based on the weight of the coating, at least one film-forming agent, at least one binder, at least one filler, and, optionally, at least one plasticizer.

A process of producing a sugarless coated or a sugar coated comestible is also disclosed. The process comprises applying to an edible core at least three coating solutions to coat the edible core, wherein each solution comprises a sweetener, at least one film-forming agent, at least one binder, optionally at least one filler, and optionally at least one plasticizer. In the process, after each coating solution is applied by spraying the solution onto the cores, the solution so applied is dried, whereby, upon application of all the solutions, a final coated product having a smooth, hard, and crunchy coating is produced.

38 Claims, No Drawings

XYLITOL COATED COMESTIBLE AND METHOD OF PREPARATION

FIELD

This invention relates to a xylitol coated comestible and to a process for producing the same. This invention also relates to a process for preparing sugarless or sugar coated comestibles.

BACKGROUND

In the past, chewing gums in the form of shaped centers or cores, e.g. pellet gums, have been coated both with sugar and sugarless coatings to produce a candy-like, crunchy outer taste in the mouth with a chewable gum center portion. Conventionally, the core is a soft chewing gum portion, whereas the coating is crunchy or hard. In the case of sugarless coatings, aqueous solutions of xylitol, mannitol, maltitol and sorbitol, known as syrups, have been primarily employed. Such syrups may contain additives such as moisture absorbing compounds, anti-adherent compounds, dispersing agents, film-forming agents, binders and the like.

U.S. Pat. No. 4,127,677 to Fronczkowski et al., issued Nov. 28, 1978, discloses a xylitol-coated chewing gum. The coating is applied via a coating syrup containing from about 55% to 70% solids of which from about 95% to about 99.5% is xylitol. The solids also include about 0.5% to about 1.5% of colorant (e.g., titanium dioxide), and about 0.5% to about 1.5% binder and/or suspending agent (e.g., gum arabic). In the Example Section (Column 4) it is disclosed that the gum centers to be coated are placed in a standard revolving coating pan. The gum pieces are dedusted using cool dry air and the xylitol-coating solution is sprayed thereon until the desired weight or gauge is reached. The coated gum pieces are jogged or tray dried and then polished, by conventional means.

U.S. Pat. No. 4,105,801 to Degliotti, issued Aug. 8, 1978, discloses a dragee comprising a core and shell of edible material enveloping the core and adhering to the latter. The shell is formed by an intimate mixture of microcrystals of xylitol with a normally solid fatty substance selected from the group consisting of mono-, di-, and triglyceride of palmitic-, stearic-, and oleic acids and cocoa butter. The proportions of fatty substance to xylitol is 0.5 to 15 parts by weight of fatty substance to each 100 parts by weight xylitol. This patent also discloses a process for preparing a dragee described above. The process is characterized in that a batch of the cores for the dragees is submitted to coating with the use of an aqueous concentrated xylitol solution having dispersed therein the fatty substance. The solution is sprayed over the batch at a temperature at which said fatty substance is in its molten or superfused state while the batch is tumbled and maintained at a temperature lower than, or at the utmost equal to, the melting point of the fatty substance.

U.S. Pat. No. 4,238,510 to Cherukuri et al., issued Dec. 9, 1980, discloses a sugarless coated comestible whose coating comprises a sweet material in crystalline form. The coating consisted essentially of sorbitol alone or in admixture, mannitol, and/or hydrogenated starch hydrolysate. The sorbitol is disclosed as being present in an amount within the range of from about 45% to about 90% by weight of the coating. Also disclosed is a method for applying the sugarless coating to centers. The method includes the steps of applying to the centers a first coating syrup which contains a sweetener such as sorbitol and/or other non-sugar sweetener, for example, mannitol or hydrogenated starch hydrolysate, an adhesion or binder component and a film-forming component, to thereby coat the centers with the first coating syrup, then a dusting mix is applied to the centers coated with the first coating syrup. The dusting mix includes one or more sweeteners, such as employed in the first coating syrup, in powdered form, and a moisture absorbing component, an anti-sticking component and a dispersing agent. It is disclosed that if desired a second coating syrup may be applied to smooth out the coating of the centers and provide a shine thereto. The second coating generally includes ingredients similar to that present in the dusting mix but dispersed in water.

U.S. Pat. No. 4,317,838 to Cherukuri et al., issued Mar. 2, 1982, discloses a method for forming a sugarless coating on centers of chewing gum or other comestibles which includes the steps of applying to the centers a coating syrup which contains a sweetener such as sorbitol and/or other non-sugar sweetener, an adhesion or binder component such as gum arabic and a film forming component, an anti-adherent or filler component, and a dispersing agent to thereby coat the centers with the coating syrup. A dusting mix including one or more sweeteners, such as employed in the coating syrup, in powdered form, and a moisture absorbing component, an anti-adherent component and a dispersing agent are also employed.

The problems associated with forming a sugarless e.g., xylitol) coating on comestibles, e.g. chewing gum, have been many. These problems include chipping, flaking, and cracking of the coating upon the attainment of the desired coating thickness, mottling of the coating, poor texture (such as a rough surface), and lack of crunchiness upon the initial chewing of the comestible. Without wishing to be bound by theory, it is believed that some of these problems may be due to inflexibility of the coating in response to the geometric shape of the comestible being coated, a deficiency in the film-forming properties of the coating, and a lack of uniformity in the crystallization of the sweetener throughout the coating.

Another problem associated with coating comestibles, such as pharmaceuticals, chewing gums, and confectioneries, are the long coating times, e.g., several hours, needed to produce a coated product. The inherently hydroscopic nature alone of some of the sugarless sweeteners usually used (e.g., xylitol, sorbitol, glycerol, and the like) creates problems in producing a finished coating that is substantially resistant to moisture absorption. Such protection from moisture is of further concern where a moisture sensitive artificial sweetener, such as for example aspartame, is to be used in the coating. The use of such sugarless sweeteners in a process involving long coating times would result in even more difficulties in obtaining a sugarless coating substantially resistant to moisture absorption. Moisture absorption by a sugarless coating could effect the coatings smoothness and hardness in an adverse way as well as substantially reducing or eliminating completely the crunchiness of the coating.

In addition, another problem, in view of present interests in both sugar and sugarless coatings, is the need to use different processes for applying the two different types of coatings. Thus, at present, if it is desired to change from applying a sugarless coating to applying a sugar coating (or visa versa) it is necessary to change the process.

Therefore, in view of the foregoing, a sugarless coated product whose coating has a good appearance, good texture, good flexibility relative to the shape of the comestible being coated, and good film-forming properties—i.e., a coating which is smooth, hard and crunchy—would be a welcome contribution to the art. In addition, a process for producing either a sugarless or a sugar coated comestible having the desired properties set forth hereinbefore (i.e., a coating which is smooth, hard and crunchy) would also be a welcome contribution to the art. Such contributions are provided by this invention.

SUMMARY OF THE INVENTION

This invention provides a sugarless (e.g., xylitol) coated comestible, whose coating has good appearance, good texture, good flexibility, good film-forming properties and good crunchiness. That is, the sugarless coated comestible has a smooth, hard and crunchy coating. The coating contains at least one film-forming agent, at least one binder, at least one filler, and optionally, at least one plasticizer, in addition to the sugarless sweetener. The coating can also contain colorants, flavoring agents, artificial sweeteners, and the like.

In particular, the invention provides a sugarless (e.g., xylitol) coated comestible comprising an edible core and sugarless coating thereon; said coating comprising about 40 to about 70 wt %, based on the weight of the coating, of a sugarless sweetener, preferably xylitol, at least one film-forming agent, at least one binder, at least one filler, and optionally, at least one plasticizer. The sugarless coated comestible may be prepared according to the process of this invention described hereinafter.

Thus, this invention also provides a process for producing a sugarless or sugar coated comestible whose coating has good appearance, good texture, good flexibility, good film-forming properties, and good crunchiness. That is, the coated comestible so prepared has a smooth, hard, and crunchy coating. The coating is obtained by applying to the comestible at least three coating solutions, each solution varying in the amount of its film-forming agent and its sweetner component, wherein each solution is sprayed sequentially onto the substrate being coated and wherein the coated substrate is dried before the application of subsequent coating solutions. Each solution may be applied repeatedly until a desired amount of coating weight or thickness is obtained. After the coating solutions have been applied a sealing coating can be applied to the coated comestible.

In the process of this invention it may be convenient to prepare stock solutions of a film coating solution and a sweetner coating solution from which the three solutions to be applied may then be prepared. The stock film coating solution may comprise at least one film-coating agent and optionally at least one plasticizer. The stock sweetener coating solution may comprise a sweetener, at least one binder, optionally at least one filler, and optionally at least one colorant. Thus, the first, second, and third coating solutions to be applied may comprise about 25 to about 35 wt % (preferably about 30 wt %), about 35 to about 45 wt % (preferably about 40 wt %), and about 45 to about 55 wt % (preferably about 50 wt %), of the stock film coating solution, respectively. The coating solutions to be applied may also comprise about 25 to about 35 wt % (preferably about 30 wt %) of the stock sweetener coating solution in the first and second coating solutions to be applied; and about 20 to about 30 wt % (preferably about 25 wt %) of the stock sweetener coating solution in the third coating solution to be applied. The balance of the percentages in the applied coating solutions being water such that the total percentage is 100.

Therefore, the first, second, and third coating solutions to be applied comprise a sweetener or mixture of sweeteners, at least one film-forming agent; at least one binder; optionally, at least one filler (for sugarless coating solutions a filler is preferred); and optionally, at least one plasticizer. One or more of the solutions may also contain known in the art ingredients, such as, for example, artificial sweeteners, colorants, flavoring agents, and the like.

One preferred embodiment of this invention involves a xylitol-coated comestible comprising an edible core and a xylitol coating thereon, said coating comprising about 40 to about 70 wt % xylitol, based on the weight of the coating, at least one film-forming agent, at least one binder, at least one filler, and, optionally, at least one plasticizer.

Another preferred embodiment of this invention involves a xylitol-coated comestible comprising an edible core and a xylitol coating thereon, said coating comprising:
about 40 to about 70 wt % xylitol, based on the weight of the coating;
at least one film-forming agent present in amounts of about 7 to about 27 wt %, based on the weight of the coating;
at least one binder present in amounts of about 1 to about 10 wt %, based on the weight of the coating;
at least one filler present in amounts of about 9 to about 20 wt %, based on the weight of the coating; and
optionally, at least one plasticizer present in amounts of about 0.5 to about 4.0 wt %, based on the weight of the coating.

An alternative embodiment of this invention provides a process for producing a sugarless coated or a sugar coated comestible which comprises applying to an edible core at least three coating solutions to coat the edible core, wherein the first coating solution comprises:
(a) about 18 to about 35 wt %, dry basis, of a sweetener;
(b) about 21 to about 30 wt %, dry basis, of at least one film-forming agent;
(c) about 0.25 to about 2.0 wt %, dry basis, of at least one binder;
(d) about 0 to about 6 wt %, dry basis, of at least one filler; and
(e) about 0 to about 5 wt %, dry basis, of at least one plasticizer; and
wherein the second coating solution comprises:
(a) about 18 to about 35 wt %, dry basis, of a sweetener;
(b) about 30 to about 40 wt %, dry basis, of at least one film-forming agent;
(c) about 0.25 to about 2.0 wt %, dry basis, of at least one binder;
(d) about 0 to about 6 wt %, dry basis, of at least one filler; and
(e) about 0 to about 6 wt %, dry basis, of at least one plasticizer; and
wherein the third coating solution comprises:
(a) about 15 to about 30 wt %, dry basis, of a sweetener;

(b) about 39 to about 48 wt %, dry basis, of at least one film-forming agent;

(c) about 0.2 to about 1.7 wt %, dry basis, of at least one binder;

(d) about 0 to about 5.5 wt %, dry basis, of at least one filler; and (e) about 0 to about 7 wt %, dry basis, of at least one plasticizer; and after each coating solution is applied by spraying the solution onto the cores, the solution is dried to produce a final coated product having a smooth, hard and crunchy coating.

DETAILED DESCRIPTION OF THE INVENTION

The cores that are coated may be any edible or ingestible core capable of having a sugarless or sugar coating applied to it. Preferably, such cores are substantially anhydrous, particularly if a relatively highly hydroscopic sweetener (such as sorbitol) is being applied to the cores. Such cores are selected from the group consisting of chewing gums, candies, and pills or tablets for medicinal or therapeutic purposes. Examples of such cores include nuts such as almonds, chunks of licorice, jellies, bonbons cast in starch molds, popcorn (preferably that obtained from corn dough because of a more regular form), tablets obtained by compression of various baked or agglomerated masses, and the like. Preferably, chewing gum is utilized as the core whereby a sugarless coated chewing gum is prepared in a "CHICLETS" (trademark of Warner-Lambert Company) type format.

By substantially anhydrous it is meant that either: (a) the edible core has a relatively low moisture content which is available and capable of migrating through or from the edible core into any applied sugarless or sugar coating; or (b) the moisture content that is present in the edible core is not readily available or not readily capable of migrating through or from the core into any applied sugarless or sugar coating. Thus, for example, candy cores comprising nougat or nougat like material having a moisture content up to about 10 wt % may be utilized since the moisture available does not readily migrate into any applied coating. When the core comprises a chewing gum, the chewing gum composition can have a moisture content up to about 5 wt % with up to about 3 wt % of water being preferred and up to about 2 wt % being most preferred.

The sweetener that can be utilized can be a sugarless sweetener or a sugar sweetener. The term "sugarless" as used herein has its usual art recognized meaning—i.e., a sweetener that is non-carogenic. Representative examples of such sugarless sweeteners include the sugar alcohols such as xylitol, sorbitol, mannitol, mixtures thereof, and the like.

The amount of sugarless sweetener utilized in the three coating solutions is an amount sufficient for the application of a useful coating having the characteristics desired, and is an amount that facilitates an even and uniform distribution of the solution utilized onto the substrate being coated. Generally, in the first and second coating solutions from about 18 to about 26 wt %, with about 20 to about 25 wt %, dry basis, of sugarless sweetener is used. In the third coating about 15 to about 23 wt %, dry basis, sugarless sweetener is usually used, with about 17 to about 21 wt % being preferred. If it is convenient to use a stock sweetener solution, as described hereinbefore, then the stock solution can normally have a density of about 1.12 to about 1.72 g/ml with about 1.42 g/ml being preferred, and a Brookfield viscosity at 70° C. for a 77 wt % aqueous solution of about 280 to about 400 CPS with about 320 CPS being preferred.

The term "sugar" as used herein includes sugar sweeteners comprising those carbohydrates known as monosaccharides, disaccharides, and polysaccharides. Representative examples include glucose (dextrose), fructose (levulose), xylose, ribose, mannose, galactose, invert sugar (a mixture of fructose and glucose derived from sucrose), sucrose, maltose, lactose, cellobiose, partially hydrolyzed starch or corn syrup, mixtures thereof, and the like.

The amount of sugar sweetener utilized in the three coating solutions is an amount sufficient for the application of a useful coating having the characteristics desired, and in an amount that facilitates an even and uniform distribution of the solution utilized onto the substrate being coated. Generally, in the first and second coating solutions from about 24 to about 35 wt %, with about 27 to about 33 wt %, dry basis, of sugar sweetener is used. In the third coating solution about 20 to about 30 wt %, dry basis, with about 22 to about 28 wt % being preferred, sugar sweetener is used. If it is convenient to use a stock sweetener solution, as described heretofore, then the stock solution can normally have a Baume degree value at 20° C. of about 37.01 to about 38.01 with about 37.5 being preferred and a specific gravity at 20° C. of about 1.3426 to about 1.3552 with about 1.3489 being preferred, which corresponds to a solids content of about 7.700 lbs/gal (0.923 kg/L) to about 7.998 lbs/gal (0.958 kg/L) with about 7.849 lbs/gal (0.941 kg/L) being preferred. Preferably, after the application of this sugar stock solution, another lesser concentrated sugar stock solution is applied. The Baume degree value at 20° C. for this lesser concentrated sugar stock solution is about 33.5 to about 34.5 with about 34.0 being preferred with a specific gravity at 20° C. of about 1.3005 to about 1.3126 with about 1.3065 being preferred, which is equivalent to a solids content of about 6.726 lbs/gal (0.806 kg/L) to about 6.990 lbs/gal (0.838 kg/L) with about 6.852 lbs/gal (0.821 kg/L) being preferred. Thus, for example, in the application of about a 14 to about a 40 wt % coating (based on the weight of the coated comestible) about 10 to about 30 wt % may be from the application of the sugar solution having the Baume degree value of about 37.01 to about 38.01, and about 4 to about 10 wt % may be from the application of the lesser concentrated sugar stock solution.

At least one film-forming agent is utilized in an amount sufficient to promote and/or provide good film-forming properties for the solution being applied to the substrate. Generally, the film-forming agent is present in amounts of about 21 to about 30 wt %, about 30 to about 40 wt %, and about 39 to about 48 wt %, dry basis, in the first, second, and third coating solutions, respectively. Preferably, the amounts present are about 25 to about 28 wt %, about 33 to about 37 wt %, and about 41 to about 46 wt %, dry basis, in the first, second, and third coating solutions, respectively. Representative film-forming agents include hydroxypropyl cellulose, methyl cellulose, (i.e., methyl ether of cellulose) ethyl cellulose, hydroxypropyl methyl cellulose, hydroxyethyl cellulose, carboxymethyl cellulose, gelatin, mixtures thereof, and the like. Preferably, a branched chained film-forming agent such as, hydroxypropyl cellulose, is utilized. Preferably, the hydroxypropyl cellulose has a Brookfield viscosity of not less than 145 cps for a 10% aqueous solution at 25° C.; and the hydroxypropyl methyl cellulose and the methyl cellulose have a Brookfield viscosity of about 12 to 18 cps for a 2% aqueous solution at 25° C. The coating solution can contain more than one film-forming agent and as such, for example, hydroxypropyl cellulose and hydroxypropyl methyl cellulose may be utilized. In such a combination, for example, the hydroxypropyl cellulose can be used in amounts of about 13.0 to about 18 wt %, about 18 to about 23 wt %, and about 23 to about 28.5 wt %, dry basis, in the first, second, and third coating solutions, respectively. Preferably about 14 to about 16.5 wt %, about 19.5 to about 21.5 wt %, and about 24.5 to about 27.5 wt. %, dry base is used in the first, second, and third coating solutions, respectively. The hydroxypropyl methyl cellulose, for example, may be used in amounts of about 9.0 to about 12.5 wt %, about 12.5 to about 16 wt %, and about 16 to about 19.5 wt %, dry basis, in the first, second and third coating solutions, respectively. Preferably the hydroxypropyl methyl cellulose is present in about 9.5 to about 11.5 wt %, about 13 to about 15 wt %, and about 17 to about 19 wt %, dry basis, in the first, second, and third coating solutions, respectively. If it is convenient to use a stock film coating solution, as described hereinbefore, then the stock solution can normally have a density of about 0.085 to about 1.20 g/ml with about 0.99 g/ml being preferred, and a Brookfield viscosity at 30°–35° C. for a 6.75 wt % aqueous solution of about 70 to about 90 CPS with about 80 CPS being preferred.

At least one binder is utilized in an amount sufficient to maintain cohesiveness amongst the additives used in the coating solution such that a uniform coating on the substrate is obtained. Representative examples of binders include gum arabic, xanthan gum, gum tragacanth, tapioca dextrin, modified food starch, highly modified food starch, zein, mixtures thereof, and the like. Preferably gum arabic is used in sugarless coatings, and highly modified waxy starch is used in sugar coatings. The binder, when used in a sugarless coating solution, is generally used in amounts of about 1.4 to about 2.0 wt %, dry basis, in the first and second coating solutions, and about 1.0 to about 1.7 wt %, dry basis, in the third coating solution. Preferably the amounts used are about 1.5 to about 1.8 wt %, dry basis, in the first and second coating solutions, and about 1.2 to about 1.5 wt %, dry basis, in the third coating solution. In sugar coating solutions highly modified waxy starch is preferably used as the binder. The binder in the sugar coating solutions is present in an amount of about 0.25 to about 0.4 wt %, dry basis, in the first and second coating solutions, and about 0.2 to about 0.3 wt %, dry basis, in the third coating solution. Preferably the amount of binder in the sugar coating solution is about 0.25 to about 0.35 wt %, dry basis, for the first and second coating solutions, and about 0.22 to about 0.28 wt %, dry basis, for the third coating solution.

Utilizable fillers include but are not limited to calcium carbonate; talc; magnesium trisilicate; titanium dioxide; dicalcium phosphate; magnesium stearate; calcium phosphate; calcium sulfate; silicas such as amorphous silicas, synthetic amorphous silicas, hydrous silica gels, synthetic silicas, sodium aluminum silicates, precipitated amorphous silicon dioxide of ultra fine particle size, and the like; mixtures thereof; and the like. Preferably calcium carbonate is used. Usually, at least one filler is used in the sugarless coating solutions in amounts sufficient to minimize and/or reduce the expense of sugarless sweeteners without adversely effecting the desired properties of the coating solution. The fillers also provide bulk support to the coating solution. Generally, the filler is used in amounts of about 4 to about 6 wt %, dry basis, in the first and second coating solutions, and about 4.0 to about 5.5 wt %, dry basis, in the third coating solution. Preferably the filler is used in amounts of about 4.5 to about 5.5 wt %, dry basis, in the first and second coating solution, and about 4.3 to about 5.0 wt %, dry basis, in the third coating solution. If desired one or more filler may be used to reduce the amount of sugar sweetener in the sugar coating solutions.

Plasticizers suitable for use are water soluble. Examples include polyethylene glycol; polyvinylpyrrolidone; oligomers of polypropylene glycol (e.g., such as those having an average molecular weight of about 1000 to about 2000); polyvinylalcohol; low molecular weight polyvinyl acetate (e.g., such as an average molecular weight of about 800 to about 1200); water soluble natural gums, such as, alginates, xanthan gum, carrageenan, and agar agar; mixtures thereof; and the like. The plasticizer is generally used in amounts sufficient to provide the desired degree of flexibility and toughness to the coating being applied and to facilitate processing. Although the plasticizer is optional, it is preferably used. Usually the plasticizer is present in amounts of about 3 to about 5 wt %, about 4.5 to about 6 wt %, and about 6 to about 7 wt %, dry basis, in the first, second, and third coating solutions, respectively. Preferably the plasticizer is present in amounts of about 3.5 to about 4.5 wt %; about 4.5 to about 5.5 wt %, and about 6.3 to about 6.8 wt %, dry basis, in the first, second, and third coating solutions, respectively. The preferred plasticizer is polyethylene glycol.

Artificial sweeteners such as the soluble saccharin salts, i.e., sodium or calcium saccharin salts, cyclamate salts, acesulfam-K, and the like, and the free acid form of saccharin may optionally be added to at least one of the sugarless coating solutions. Dipeptide sweeteners such as L-aspartyl-L-phenylalanine methyl ester and materials described in U.S. Pat. No. 3,492,131, and the like may be added to the sugarless coating solutions. These sweeteners are usually used in amounts of about 0.01 to about 0.30 wt %, but may be used in amounts of about 0.05 to about 0.25 wt % and even about 0.005 to about 0.5 wt % based on the weight of the total comestible.

Coloring agents, such as, for example, titanium dioxide may also be added to at least one of the coating solutions. The colorant may be added in amounts sufficient to impart the desired color as long as the ability to apply a useful coating is not adversely effected. Generally, colorants in amounts of about 0.2 to about 0.4 wt %, dry basis, may be used.

In carrying out the process of the invention, the application of a coating solution can be repeated as many times as necessary to build up a desired coating weight and thickness on the edible cores. Coatings of about 14 to about 40% by weight of the coated comestible may be applied. For example, about a 27% coating level (i.e., a coating which is about 27% by weight of the coated comestible) may be applied. The 27% coating level may be obtained by applying about a 6 to about an 11% by weight coating of the first coating solution. The application of the first coating solution is followed by the application of the second coating solution until the total coating on the comestible is about 16 to about 22% by weight. Then the third coating solution is applied until the total coating on the comestible is about 22 to about 27% by weight.

The coating solutions are applied using techniques and equipment suitable for controlling the application of the coating solutions and the conditions for drying the coating solutions applied such that a coated comestible having the desired characteristics is obtained—i.e., a smooth, hard and crunchy coating is obtained. Generally, the solutions are sprayed on the cores while the cores are in a side vented rotating pan. Spraying is usually accomplished using air spraying techniques known to those skilled in the art, such as by air atomization of the solution to be applied. Optimum conditions and results are obtained using an air spray system such as those systems having a side vented, aero-automated hydraulic system. Such equipment allows the air flow rates, air temperature, spray rate, as well as humidity to be controlled in order to obtain optimum coating conditions and therefore the optimum results.

The comestible to be coated is placed in the revolving pan and, if necessary, the comestible is allowed to tumble to remove any dust or to break apart any comestibles in the form of sheets—such as when the cores are chewing gum pellets. Then each coating solution is applied and dried until the desired amount of weight or thickness of coating is obtained. Subsequent coating solutions or portions of coating solutions are applied to the comestible after the previously applied coating is dry. Thus, the application and drying can be repeated as many times as desired to obtain the coating desired. Conditions are set and monitored on the side vented pans to obtain the optimum coating and drying conditions. Usually the best indicator of an adequate balance between the air flow rate, air temperature, spray rate, and humidity is the bed temperature. Generally, the bed temperature is about 25° to about 40° C. and preferably about 35° to about 40° C. The air flow rates are usually about 150 to about 200 CFM (cubic feet per minute) with the incoming air at a temperature of about 60° to about 65° C. The humidity of the air entering is usually at about 10 to about 30%. The coating solutions may be applied at a solution temperature of about 30° to about 50° C. with about 35° to about 45° C. being preferred, and at a spray rate of about 20 to about 60 g/ml with about 30 g/ml being preferred, while the pan is rotating at about 10 to about 14 RPM with about 12 RPM being most preferred. Generally, under these conditions the coating dries substantially faster than conventional processes, e.g., within about 1 to about 5 seconds. Usually the coating dries substantially instantaneously upon its application to the cores when applied at an air temperature of about 43° to about 49° C., and preferably about 46° C. At any desired point in the sequence of coating applications flavoring agents may be added if desired. Usually the flavoring agents are added as a separately applied coating to the shell being produced. After all the coating solutions are applied the coated comestible may then be placed in a polishing pan for the addition of the sealing coating hereinafter described.

Flavoring Agents (flavorings) may be added to the coating. Suitable flavoring agents include those described hereinafter for use in the chewing gum compositions. When applied in the coating the flavoring agent is usually used in amounts of about 0.05 to about 0.10 wt % with about 0.06 to about 0.09 wt % being preferred, and about 0.07 to about 0.09 wt % being most preferred.

After the final application of coating solution, and after such applied coating has dried, a sealing coating is preferably applied to the coated comestible. The sealing coating seals out moisture and aids in giving the coated comestible a polished appearance. The sealing coating comprises a sealant such as, for example, a blend of natural and artificial food grade waxes (such as a blend of beeswax, microcrystalline wax, paraffin wax, and the like), candelilla wax, paraffin wax, shellac, carnauba wax and the like. Usually, the sealing coating comprises about 0.01 to about 0.6 wt % of the total coating with about 0.05 to about 0.2 wt % being preferred.

When the edible core is chewing gum, the chewing gum composition may be formulated from standard ingredients and by known methods in the art. The composition is comprised of a gum base and such additional additives which would ordinarily be included to comprise a sugarless chewing gum composition, i.e., sweeteners comprising natural or synthetic sugar substitutes, flavor, fillers and the like; or, where utilized, to comprise a sugar containing chewing gum composition, i.e., corn syrup, sugar, flavor, fillers and the like.

Suitable chewing gum compositions are described in U.S. Pat. No. 4,514,422 to Yang et al., issued Apr. 30, 1985; U.S. Pat. No. 4,579,738 to Cherukuri et al., issued Apr. 1, 1986; U.S. Pat. No. 4,581,234 to (Cherukuri et al., issued Apr. 8, 1986; and U.S. Pat. No. 4,587,125 to Cherukuri et al., issued May 6, 1986 the disclosures of each being incorporated herein by reference thereto.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base used in this invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene, polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood rosin, penataerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated ethyl ester of rosin and mixtures thereof. The elastomer solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerin, lecithin, and glyceryl monostearate and the like, may also be incorporated into the gum base to obtain a variety of desirable textures and consistency properties. These additional materials are generally employed in amounts of up to about 30% by weight and preferably in amounts of from about 3% to about 5% by weight of the final gum base composition.

The chewing gum compositions employing the instant gum bases generally contain sweetening agents. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch or corn syrup solids and sugar alcohols such as sorbitol, xylitol mannitol, hydrogenated starch hydrolysate and mixtures thereof;

B. Water-soluble artificial sweeteners such as the soluble saccharin salts, i.e., sodium or calcium saccharin salts, cyclamate salts, acesulfam-K and the like, and the free acid form of saccharin; and C. Dipeptide based sweeteners such as L-aspartyl-L-phenylalanine methyl ester and materials described in U.S. Pat. No. 3,492,131 and the like.

In general, the amount of sweetener will vary with the desired amount of sweetener selected for a particular chewing gum composition. This amount will normally be 0.01% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dioxide; emulsifiers such as lecithin and glyceryl monostearate; and fillers such as aluminum hydroxide, alumina, aluminum silicates, talc, dicalcium phosphate, calcium carbonate, and combinations thereof. Preferably the amount of fillers used is about up to 25% by weight of the gum base.

Natural and synthetic flavoring agents well known to the chewing gum art may be added to the chewing gum compositions of the instant invention. These flavoring agents may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds, and cassia oil. Also useful are artificial, natural or synthetic fruit flavors such as vanilla, and citrus oil, including lemon, orange, grape, lime and grapefruit and fruit essences including apple, pear, peach, strawberry, raspberry, cherry, plum, pineapple, apricot and so forth.

The amount of flavoring agent employed in the chewing gum shell is normally a matter of preference subject to such factors as flavor type, gum base type and strength desired. In general, amounts of about 0.5% to about 3.0% by weight of the final chewing gum composition are useable with amounts of about 0.3% to about 1.5% being preferred and about 0.7% to about 1.2% being most preferred.

The colorants that may be used include pigments such as titanium dioxide and may be incorporated in amounts of up to 1% or higher by weight. Also, the colorants may include other dyes suitable for food, drug and cosmetic applications, and known as F.D.&C. dyes and lakes.

The following examples are illustrative only and should not be construed as limiting the invention in any way. Those skilled in the art will appreciate that variations are possible which are within the spirit and scope of the appended claims.

In the examples that follow: (1) the hydroxypropyl cellulose had a Brookfield viscosity of not less than 145 cps for a 10% aqueous solution at 25° C. and (2) the hydroxypropyl methyl cellulose had a Brookfield of about 12 to 18 cps for a 2% aqueous solution at 25° C.

Also, in the examples that follow the chewing gum composition, used as the cores, had a moisture content of about 1.5 wt % based on the weight of the chewing gum composition.

Additionally, in the examples that follow, unless indicated otherwise, a coating layer applied is dried before a subsequent layer is applied.

All percentages recited throughout the specification are based on the weight of solution used unless indicated otherwise.

EXAMPLE I

In this example, representative of the invention, the xylitol coated and sugar coated chewing gum cores of Table 1 were prepared in a "CHICLETS" (Trademark of Warner-Lambert Company) type format.

Solutions A–C, used in making the coated cores are set forth in Tables 2–4, respectively. The solutions were prepared using a G/W Homo-mixer (mixer).

In the preparation of the solutions, the order of mixing the ingredients, is not critical. However, as those skilled in the art can appreciate, the celluloses which are solids are difficult to dissolve. Therefore, solutions containing them are conveniently made by first dissolving the cellulose in the ingredient having the most amount of water. The celluloses are dissolved using high shear (vigorous mixing) generally before any other solid is dissolved in the solution. This method of mixing is usually used to avoid clumping of the cellulose. In general when Solution A (comprising celluloses) is mixed with another solution it is vigorously mixed until a homogeneous mixture is obtained.

TABLE 1

| Ingredients | Coated Cores Percent w/w | | | |
| --- | --- | --- | --- | --- |
|  | 1 | 2 | 3 | 4 |
| Chewing Gum Cores | 73.0 | 79.8 | 79.8 | 60.0 |
| Solution A | 3.8 | 5.0 | 5.0 | 4.0 |
| Solution B | 23.0 | 15.0 | 15.0 | — |
| Flavor Blend (peppermint oil) | 0.023 | 0.023 | 0.023 | — |
| Sodium Saccharin | 0.006 | 0.005–0.04 | — | — |

TABLE 1-continued

| | Coated Cores Percent w/w | | | |
|---|---|---|---|---|
| Ingredients | 1 | 2 | 3 | 4 |
| Solution (36.8% solids) | | | | |
| Aspartame | — | — | 0.01–0.03 | — |
| Candellila Wax Powder | 0.171 | 0.171 | 0.171 | — |
| Solution C | — | — | — | 36.0 |

TABLE 2

Solution A - Film Coating Stock Solution

| Ingredients | Percent (w/w) |
|---|---|
| Hydroxypropyl Cellulose | 4.00 |
| Hydroxypropyl Methyl Cellulose | 2.75 |
| Polyethylene Glycol | 1.00 |
| Water, Potable | 92.25 |

TABLE 3

Solution B - Stock Sweetener Coating Solution

| Ingredients | Percent (w/w) |
|---|---|
| Xylitol | 57.876 |
| Calcium Carbonate Precipitated USP | 13.805 |
| Titanium Dioxide | 0.885 |
| Gum Arabic | 4.425 |
| Water, Potable | 23.009 |

TABLE 4

Solution C - Stock Sugar Coating Solution

| Ingredients | Percent (w/w) |
|---|---|
| Highly Modified Waxy Starch | 0.8 |
| Sugar (sucrose) Fine Granulated | 76.3 |
| Water, Potable | 22.9 |

Solution A was prepared by heating about 60% of the total amount of water used to about 70° C. The polyethylene glycol was added with mixing until it was dissolved. Then the celluloses were added with vigorous mixing until completely dissolved. Mixing was continued while the solution cooled to room temperature (24° C.). The remaining 40% of the total amount of water used was added at about 20° C. Agitation was maintained during use.

Solution B was prepared by dissolving the xylitol in about 60% of the total amount of water with such water being at about 80°–90° C. Then about 64% of the total amount of calcium carbonate was added to the xylitol solution. The gum arabic was dissolved in the remaining water (40% of the total amount of water) with the water being at 20° C. The remaining 36% of the total amount of calcium carbonate was mixed into the gum arabic solution. The xylitol solution and the gum arabic solution were then mixed together until homogenous. The titanium dioxide was then mixed into this resulting solution until the titanium dioxide was well dispersed. The solution was maintained at 70°–80° C. with constant stirring until it was used.

Solution C was prepared by blending the ingredients together to produce a homogenous mixture.

The chewing gum cores were placed on the rotating pan and were dedusted, and any sheets of cores present were broken apart into separate cores. Then the following solutions were prepared and applied to the cores using an air spray system as previously described:

(A) The first coating solution was prepared by blending 30 wt % of Solution A, 30 wt % of Solution B and 40 wt % of potable water together. The first coating solution was applied at 35°–40° C. until about 13.5%–14% total shell coating was obtained.

(B) The second coating solution was prepared by blending 40 wt % of Solution A, 30 wt % of Solution B, and 30 wt % of potable water together. To this blend 50% of the total amount of flavor and artificial sweetener (saccharin or aspartame as per Table 1) used is added. The second coating solution is applied at 30°–35° C. until about a 20.0%–21.0% total shell coating was obtained.

(C) The third coating solution was prepared by blending 50 wt % of Solution A, 25 wt % of Solution B, and 25 wt % of potable water together. To this blend 50% of the total amount of flavor and artificial sweetener (saccharin or aspartame as per Table 1) used was added. The third coating solution was applied at 30°–35° C. until about a 27.0–27.5% total shell coating was obtained.

(D) The coated chewing gum cores obtained were then polished for up to about 20-30 minutes in a rotating polishing pan using powdered candelilla wax.

The sugar coated chewing cores of Table 1 were prepared following the aforementioned procedure except Solution C was used instead of Solution B.

When chewed it was found that the coatings obtained were smooth, hard and crunchy.

The invention being thus described, it will be obvious that the same may be varied in many ways. Such variations are not to be regarded as a departure from the spirit and the scope of the invention and all such modifications are intended to be included within the scope of the claims.

What is claimed is:

1. A xylitol-coated comestible comprising an edible core and a xylitol coating thereon, said coating comprising:
   about 40 to about 70 wt % xylitol, based on the weight of the coating;
   at least one film-forming agent present in amounts of about 7 to about 27 wt %, based on the weight of the coating;
   at least one binder present in amounts of about 1 to about 10 wt %, based on the weight of the coating;
   at least one filler present in amounts of about 9 to about 20 wt % based on the weight of the coating; and
   optionally, at least one plasticizer present in amounts of about 0.5 to about 4.0 wt % based on the weight of the coating.

2. The comestible of claim 1 wherein said edible core is selected from the group consisting of: chewing gum, candy, and a pill or tablet for medicinal or therapeutic purposes.

3. The comestible of claim 1 wherein said edible core is chewing gum.

4. The comestible of claim 1 wherein said coating additionally contains an artificial sweetener.

5. The comestible of claim 1 wherein said film-forming agent is selected from the group consisting of: hydroxyproply cellulose, hydroxypropyl methyl cellulose, methyl cellulose, ethyl cellulose, hydroxyethyl cellulose, gelatin, carboxymethyl cellulose, and mixtures thereof.

6. The comestible of claim 1 wherein said binder is selected from the group consisting of gum arabic, xanthan gum tragacanth, tapioca dextrin, modified food starch, and mixtures thereof.

7. The comestible of claim 1 wherein said filler is selected from the group consisting of calcium carbonate, talc, magnesium trisilicate, titanium dioxide, dicalcium phosphate, magnesium stearate, calcium phosphate, calcium sulfate, silcas, and mixtures thereof.

8. The comestible of claim 1 wherein said plasticizer is selected from the group consisting of polyethylene glycol, polyvinylpyrrolidone, oligomers of polypropylene glycol, water soluble natural gums, and mixtures thereof.

9. The comestible of claim 1 wherein:
(a) said film-forming agent is selected from the group consisting of: hydroxypropyl cellulose, hydroxypropyl methyl cellulose, methyl cellulose, ethyl cellulose, hydroxyethyl cellulose, gelatin, carboxymethyl cellulose, and mixtures thereof;
(b) said binder is selected from the group consisting of gum arabic, xanthan gum, gum tragacanth, tapioca dextrin, modified food starch, and mixtures thereof;
(c) said filler is selected from the group consisting of calcium carbonate, talc, magnesium trisilicate, titanium dioxide, and mixtures thereof; and
(d) said plasticizer is selected from the group consisting of polyethylene glycol, polyvinylpyrrolidone, oligomers of polypropylene glycol, water soluble natural gums, and mixtures thereof.

10. The comestible of claim 9 wherein said film-forming agent is a blend of hydroxyproply cellulose and hydroxyproply methyl cellulose, said binder is gum arabic, said filler is calciuim carbonate, and said plasticizer is polyethylene glycol.

11. The comestible of claim 4 wherein said artificial sweetener is used in amounts of about 0.01 to about 0.30 wt %, based on the weight of the total comestible.

12. The comestible of claim 4 wherein said artificial sweetener is a dipeptide sweetener.

13. The comestible of claim 12 wherenn said dipeptide sweetener is L-aspartyl-L-phenylalanine methyl ester.

14. A process for producing a sugarless coated or a sugar coated comestible by applying to an edible core at least a first coating solution, a second coating solution and a third coating solution, which process comprises spraying said first coating solution onto the core and drying said first coating solution, spraying said second coating solution directly onto the dried first coating solution and drying said second coating solution, and spraying said third coating solution directly onto the dried second coating solution and drying said third coating solution, thereby producing a final coated product having a smooth, hard and crunchy coating to coat the edible core,
wherein the first coating solution comprises:
(a) about 18 to about 35 wt %, dry basis, of a sweetener;
(b) about 21 to about 30 wt %, dry basis, of at least one film-forming agent;
(c) about 0.25 to about 2.0 wt %, dry basis, of at least one binder;
(d) about 0 to about 6 wt %, dry basis, of at least one filler; and
(e) about 0 to about 5 wt %, dry basis, of at least one plasticizer.

15. The process of claim 14 wherein an additional step is added in which a sealing coating is applied to said coated comestible after the sugarless or sugar coating has been applied.

16. The process of claim 15 wherein said sealing coating comprises a sealant selected from the group consisting of a blend of natural and artificial food grade waxes, candelilla wax, paraffin wax, shellac and mixtures thereof.

17. The process of claim 14 wherein said sweetener is selected from the group consisting of: sugarless sweeteners and sugar sweeteners.

18. The process of claim 17 wherein said sugar sweeteners are selected from the group consisting of: xylose, ribose, glucose, mannose, galactose, fructose, dextrose, sucrose, maltose, partially hydrolyzed starch or corn syrup solids, and mixtures thereof.

19. The process of claim 17 wherein said sugarless sweeteners are selected from the group consisting of: xylitol, sorbitol, mannitol, and mixtures thereof.

20. The proces of claim 14 wherein said film-forming agent is selected from the group consisting of: hyroxypropyl cellulose, hydroxypropylmethyl cellulose, ethyl cellulose, hydroxyethyl cellulose, gelatin, carboxymethyl cellulose, and mixtures thereof.

21. The process of claim 14 wherein said binder is selected from the group consisting of gum arabic, xanthan gum, gum tragacanth, tapioca dextrin, modified food starch, highly modified waxy starch, and mixtures thereof.

22. The process of claim 14 wherein said plasticizer is selected from the group consisting of polyethylene glycol, polyvinylpyrrolidone, oligomers of polypropylene glycol, water soluble natural gums, and mixtures thereof.

23. The process of claim 14 wherein said filler is selected from the group consisting of: calcium carbonate, talc, magnesium trisilicate, titanium dioxide, and mixtures thereof.

24. The process of claim 14 wherein an additional step is added in which the application of each coating solution is repeated.

25. The process of claim 14 wherein at least one of said coating solutions additionally contains an artificial sweetener in an amount of about 0.01 to about 0.30 wt %, dry basis.

26. The process of claim 14 wherein said edible core is selected from the group consisting of: chewing gum, candy, pills and tablets.

27. The process of claim 17 wherein said sweetener is a sugarless sweetener present in amounts of about 18 to about 26 wt % in said first and second coating solution, and about 15 to about 23 wt % in said third coating solution, wherein said film-forming agent is present in amounts of about 21 to about 30 wt %, about 30 to about 40 wt %, and about 39 to about 48 wt % in said first, second, and third coating solutions respectively; wherein said binder is present in amounts of about 1.4 to about 2.0 wt % in said first and second coating solutions, and about 1.0 to about 1.7 wt % in said third coating solution; wherein said filler is present in amounts of about 4 to about 6 wt % in said first and second coating solutions, and about 4.0 to about 5.5 wt % in said third coating solution; and wherein said plasticizer is present in amounts of about 3 to about 5 wt %, about 4.5 to about 6 wt %, and about 6 to about 7 wt % in said first, second and third coating solutions respectively.

28. The process of claim 27 wherein said sweetener is xylitol; said film-forming agent is a mixture of hydroxypropyl cellulose and hydroxypropylmethyl cellulose; said binder is gum arabic; said filler is calcium carbonate; and said plasticizer is polyethylene glycol.

29. The process of claim 28 wherein the edible core is chewing gum; and wherein at least one solution additionally contains an artificial sweetener in an amount of about 0.01 to about 0.30 wt %, dry basis; and a sealing coating comprising a sealant is applied to the edible core after the sugarless coating has been applied.

30. The process of claim 29 wherein at least one solution additionally contains a colorant in an amount of about 0.2 to about 0.4 wt %, dry basis; and wherein said sealant is candelilla wax.

31. The process of claim 17 wherein said sweetener is a sugar sweetener present in amounts of about 24 to about 35 wt % in said first and second coating solution, and about 20 to about 30 wt % in said third coating solution; wherein said film-forming agent is present in amounts of about 21 to about 30 wt %, about 30 to about 40 wt %, and about 39 to about 48 wt % in said first, second, and third coating solutions respectively; wherein said binder is present in amounts of about 0.25 to about 0.4 wt % in said first and second coating solutions, and about 0.2 to about 0.3 wt % in said third coating solution; and wherein said plasticizer is present in amounts of about 3 to about 5 wt %, about 4.5 to about 6 wt %, and about 6 to about 7 wt % in said first, second and third coating solutions respectively.

32. The process of claim 31 wherein said sweetener is sucrose; said film-forming agent is a mixture of hydroxypropyl cellulose and hydroxypropylmethyl cellulose; said binder is highly modified waxy starch; and said plasticizer is polyethelene glycol.

33. The process of claim 14 wherein said spraying is by air atomization and said coating dries substantially instantaneously upon its application to said core.

34. The process of claim 14 wherein at least one of said coating solutions additionally contains an artificaial sweetener.

35. The process of claim 27 wherein at least one of said coating solutions additionally contains an artificial sweetener.

36. The process of claim 35 wherein said artificial sweetener is a dipeptide sweetener.

37. The process of claim 36 wherein said dipeptide sweetener is L-aspartyl-L-phenylalanine methyl ester.

38. The process of claim 29 wherein said artificial sweetener is L-aspartyl-L-phenylalanine methyl ester.

* * * * *

UNITED STATES PATENT AND TRADEMARK OFFICE
CERTIFICATE OF CORRECTION

PATENT NO. : 4,828,845
DATED : May 9, 1989
INVENTOR(S) : Zamudio-Tena, et al.

It is certified that error appears in the above-identified patent and that said Letters Patent is hereby corrected as shown below:

In Claim 6, line 3, before the word "tragacanth" insert --, gum--.

In Claim 14, line 24, after the word "plasticizer" insert -- ;and wherein the second coating solution comprises:

(a) about 18 to about 35 wt %, dry basis, of a sweetener;

(b) about 30 to about 40 wt %, dry basis, of at least one film-forming agent;

(c) about 0.25 to about 2.0 wt %, dry basis, of at least one binder;

(d) about 0 to about 6 wt %, dry basis, of at least one filler; and (e) about 0 to about 6 wt %, dry basis, of at least one plasticizer; and

UNITED STATES PATENT AND TRADEMARK OFFICE
CERTIFICATE OF CORRECTION

PATENT NO. : 4,828,845

DATED : May 9, 1989

INVENTOR(S) : Zamudio-Tena, et al.

It is certified that error appears in the above-identified patent and that said Letters Patent is hereby corrected as shown below:

wherein the third coating solution comprises:

(a) about 15 to about 30 wt %, dry basis, of a sweetener;

(b) about 39 to about 48 wt %, dry basis, of at least one film-forming agent;

(c) about 0.2 to about 1.7 wt %, dry basis, of at least one binder;

(d) about 0 to about 5.5 wt %, dry basis, of at least one filler; and (e) about 0 to about 7 wt %, dry basis, of at least one plasticizer; and after each coating solution is applied by spraying the solution onto the cores, the solution is dried to produce a final coated product having a smooth, hard and crunchy coating--.

UNITED STATES PATENT AND TRADEMARK OFFICE
CERTIFICATE OF CORRECTION

PATENT NO. : 4,828,845

DATED : May 9, 1989

INVENTOR(S) : Zamudio-Tena, et al.

It is certified that error appears in the above-identified patent and that said Letters Patent is hereby corrected as shown below:

In Claim 24, line 3, after the word "repeated" add --until a desired amount of coating is applied--.

In Claim 32, line 5, "polyethelene" should read --polyethylene--.

Signed and Sealed this

Fourteenth Day of November, 1989

Attest:

JEFFREY M. SAMUELS

Attesting Officer     Acting Commissioner of Patents and Trademarks